United States Patent
Cronin et al.

(10) Patent No.: US 11,928,422 B1
(45) Date of Patent: Mar. 12, 2024

(54) EXPLANATORY CONFIGURATION FUNCTION ANNOTATION

(71) Applicant: Arista Networks, Inc., Santa Clara, CA (US)

(72) Inventors: David Cronin, Dundalk (IE); Sharad Birmiwal, Vancouver (CA); Paraic Gallagher, Galway (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/158,818

(22) Filed: Jan. 24, 2023

(51) Int. Cl.
*G06F 40/169* (2020.01)
*G06F 11/36* (2006.01)
*G06F 40/205* (2020.01)

(52) U.S. Cl.
CPC ........ *G06F 40/169* (2020.01); *G06F 11/3664* (2013.01); *G06F 40/205* (2020.01)

(58) Field of Classification Search
CPC .......................... G06F 40/169; G06F 11/3664
See application file for complete search history.

(56) References Cited

U.S. PATENT DOCUMENTS

| | | | | |
|---|---|---|---|---|
| 2006/0271917 A1* | 11/2006 | Das | ........................... | G06F 8/31 717/130 |
| 2006/0294502 A1* | 12/2006 | Das | ........................... | G06F 8/73 717/129 |
| 2010/0138820 A1* | 6/2010 | Joshi | ................... | G06F 11/3612 717/158 |
| 2018/0024911 A1* | 1/2018 | Kruszewski | ........ | G06F 11/3664 717/125 |
| 2019/0227911 A1* | 7/2019 | Raviv | ................... | G06F 40/169 |
| 2020/0125475 A1* | 4/2020 | Iyer | ..................... | G06F 11/3644 |

* cited by examiner

*Primary Examiner* — Asher D Kells
(74) *Attorney, Agent, or Firm* — Fountainhead Law Group P.C.

(57) ABSTRACT

Systems, methods, and computer-readable media are disclosed for annotating configuration language function evaluation. One or more configuration language expressions may be received by a configuration language development environment. The one or more configuration language expressions may be parsed into one or more atomic configuration language expressions. Based on a particular route at the specified point of execution in an application, the one or more configuration language expressions may be evaluated. The annotations may be rendered to provide an explanation of an underlying control flow.

20 Claims, 5 Drawing Sheets

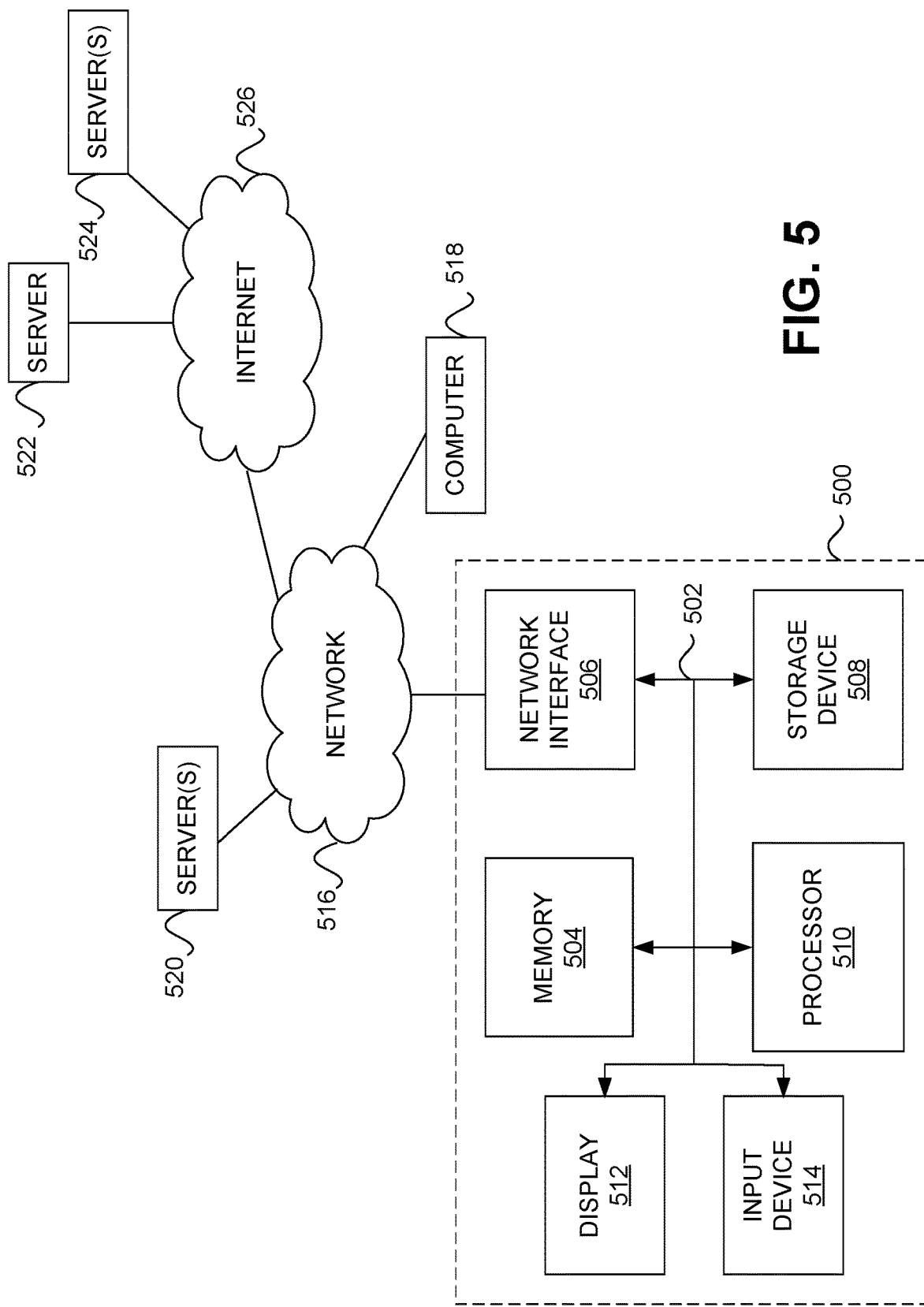

EXPLANATORY CONFIGURATION FUNCTION ANNOTATION

BACKGROUND

Routing policies in a network device (e.g., switch, router, etc.) can specify which and how routes are programmed into the routing tables and how routes are advertised. Users can create routing policies with technologies such as route maps and RCFs (Routing Control Functions) to implement granular network controls. RCF is a tool that allows the user to define policy functions to evaluate routes.

Network device routing control functions (RCF) can be complex, and understanding which expressions and assignments were executed can be difficult. The interaction of multiple expressions in a logical condition (multiple 'AND' operators for example) and how some operators take precedence over others may not be immediately obvious to a reader of the RCF code. Nested function calls can also make understanding a function's behavior difficult.

BRIEF DESCRIPTION OF THE DRAWINGS

With respect to the discussion to follow, and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 illustrates an exemplary host hardware platform according to one or more embodiments.

DETAILED DESCRIPTION

Overview

Figure 1:
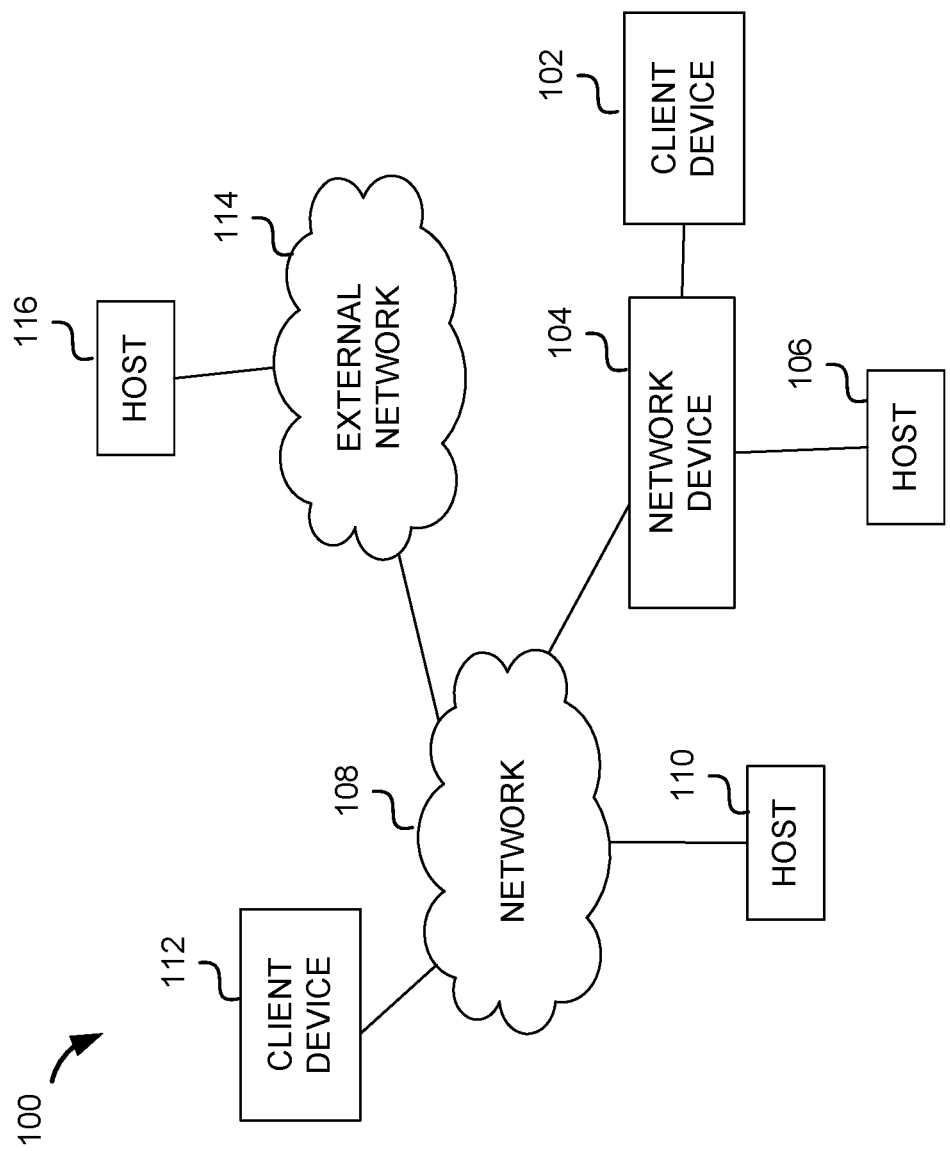
FIG. 1 illustrates an environment in which mechanisms operate for annotating configuration language function evaluation according to one or more embodiments.

The present teachings provide an improved RCF evaluation engine that can provide a textual representation explaining the control flow of a given evaluation of an RCF function. This textual representation aids the user in understanding how an RCF function evaluates a given route at a specified point of application. It indicates: (a) an overall result of an RCF evaluation; (b) the RCF code that was evaluated; (c) the results of individual expressions; (d) the evaluation of operators, including: (i) the overall result of the operator; (ii) whether the operators evaluation was short circuited; (iii) the precedence in the evaluation of multiple operators in a single expression; and (iv) the evaluation of called functions, including: the overall result of the called function; and the evaluation of the called function's contents. An existing "show" command exists for debugging the control flow of a route map, for example, the command "show bgp debug policy" may be used to show a border gateway protocol (BGP) debug policy.

In some embodiments, use of a command line "show" command may display an explanatory configuration function annotation. Mechanisms consistent with the present teachings extend this show command to allow debugging the evaluation of an RCF function at a point of application (POA) in BGP or other routing protocol. Corresponding logic for such annotations is not client specific, meaning that it would not be necessary to reimplement annotation or debug evaluation logic for multiple agents and the only client logic is to assemble the path information specified and evaluate the RCF function in a "debug mode." Such logic involves gathering routing path information with respect to inbound routes, outbound routes, and route redistribution, for example. Mechanisms consistent with the present teachings then evaluate a route map corresponding to the gathered path.

Mechanisms consistent with the present teachings may invoke a debug RCF evaluation in the same environment as it would happen at that POA. A purpose of the BGP protocol is to exchange prefixes with configured BGP neighbors. If a user is debugging their RCF function against a prefix from a BGP neighbor on an inbound route, then the user would like to see exactly how that RCF function was evaluated. If the RCF function is not evaluating as they expect because of a particular behavior of RCF at that POA then this should be reflected in the debug output.

In some embodiments, the output of a debug command for RCF follows several rules. Corresponding debug output may display user written RCF code alongside explanations for control flow while indicating which branches were taken and which functions were invoked, including a conditional result showing attribute values. A line of RCF code is displayed when part of the RCF code is evaluated, for example the portions of a line of code are displayed where part of the line of code was evaluated including parts of the line that were not evaluated. In some embodiments, comments are displayed where they are on the same line as the RCF code under evaluation. Lines in a block of code are not displayed if they are not evaluated. Lines of RCF code are not evaluated unless part of the line is, e.g., an "if" statement that evaluates to false.

Branch conditions are not displayed if they are not evaluated, e.g., the "else if" condition where the "if" branch was taken. An explanatory line of code may be displayed when part of the line is important for understanding evaluated code on another line even if code on that line is not actually "evaluated." In some embodiments, lines containing the following are displayed if they are evaluated. Invoked function definition statements may be displayed as well as block labels, if the block was entered. Block curly braces may be displayed when entering or leaving the scope that the braces define. Expression brackets may be displayed where the user has placed the brackets if the conditions they pertain to are evaluated. Lines of code may be displayed with expressions that were not evaluated; however, the expression is part of a larger expression that needs to be explained, e.g., with an "if" condition across multiple lines we will display the entire condition even if it failed on the first line.

In these embodiments, the debug output displays corresponding RCF code with the same structure as it was written. For example: if two expressions, assignments, function calls, or "if" statements are on the same line in the user's code as written, then the debug output will render the statements on the same line. If an expression or attribute condition is written over multiple lines then the debug output will be rendered over multiple lines in the same structure. However, spacing may be inserted into the user's code in order to format brackets to explain implicit operator precedence. In order to explain the control flow of an evaluation, the debug output may display the trinary result of an expression, e.g., conditions, operators, or function calls. The overall result of statements, e.g., 'if' or 'return' statements, are evaluated, regardless of whether they return a result, e.g., assignment statements.

Explanations are provided for called functions within a function, both their result and the evaluation of the corresponding contents. The current value of the left-hand side (LHS) of a condition or assignment corresponds to the new value of the LHS after an assignment. The explanation terms in an expression may be grouped together. If an expression is set forth over multiple lines, and one of the terms of an expression is a function call, the explanation of the function call will be deferred until the expression is fully explained. If a new expression starts on the same line that the previous expression ends, then the new expression will be fully explained before the function calls from the first expression are explained. The output will indicate the line number of the code being displayed. The debug output may indicate which code unit a function is part of.

A command line interface (CLI) command is invoked to debug the RCF evaluation of a route at a point of application. The RCF evaluation is explained by way of textual annotations displayed above each line of evaluated RCF code. Example annotations are set forth below in connection with Table 1 below.

TABLE 1

| Name | Annotation | Purpose |
| --- | --- | --- |
| Evaluation bar | ------------ | Indicates a statement or assignment was evaluated. |
| True bar | T------------ | Indicates a condition, operator, or function call evaluated to true. |
| False bar | F------------ | Indicates a condition, operator, or function call evaluated to false. |
| Unknown bar | U------------ | Indicates a function call evaluated to unknown. |
| Exit bar | X------------ | Indicates the evaluation of a statement, expression, operator, or function call was halted due to an 'exit' statement. |
| Continuation bar | \------------ | Indicates that an evaluated statement, assignment, expression, or function call is continuing on from the previous line. |

In some alternative embodiments, more verbose output may be provided. Such a verbose debug output may provide verbose explanations for what occurred during the evaluation by way of complete sentences rendered below the user's expressions. Debug output consistent with the present teachings may not be strictly chronological. It may be beneficial to explain a line in its entirety before explaining what happened in the functions called on that line. If an attribute is modified inside of a function call made in the middle of an expression this can affect later terms in that expression. However, this need not be the case. If the output were strictly chronological then the output would explain the contents of the function call before explaining a third term. This would make the annotated output appear disjointed and would prevent the reader from easily understanding behavior of an overall expression without paging up and down the code to pass over the function calls, involving a potentially long explanation. In some embodiments, abandonment of strict chronological order facilitates understanding an overall expression before diving into the expression's constituent parts.

Network Architecture

FIG. 1 illustrates an environment 100 in which mechanisms operate for annotating configuration language function evaluation according to one or more embodiments. As shown in environment 100, client devices such as client device 102 and client device 112 may be directly or (as in the case of client device 112) indirectly connected to network device 104. Client device 112 is depicted as being indirectly connected to network device 104 through network 108, however it is understood that client device 112 could be connected to network device 104 through any number of internal or external networks of any kind. Client devices as depicted in connection with environment 100 may be used to establish a connection with network device 104 in order to configure network device 104. In some embodiments, the connection is a console connection or a virtual console connection. In some such embodiments, the console connection between the client device 102 and network device 104 may be a serial console connection. In some other embodiments, the console connection may be a secure virtual console connection such as a secure shell (SSH) connection. In these embodiments, an SSH connection may also (or alternatively) be made over one or more networks from client device 112.

In some such embodiments, network device 104 may be configured to facilitate a network connection between at least two hosts such as host 116 and host 106. In these embodiments at least a portion of the network configuration of network device 104 involves a border gateway protocol (BGP) configuration, which enables the exchange of routing and reachability information among autonomous systems (AS) on the Internet. Some such autonomous systems may exist in network 108 and/or external network 114. Once a client device has made a connection to network device 104, configuration of network device 104 may be performed via a command line interface (CLI). In some such embodiments, the CLI is provided in connection with standard terminal encoding. In some other embodiments, a graphical user interface is provided for a richer integrated development environment (IDE) type user experience.

Example Implementations

Figure 2:
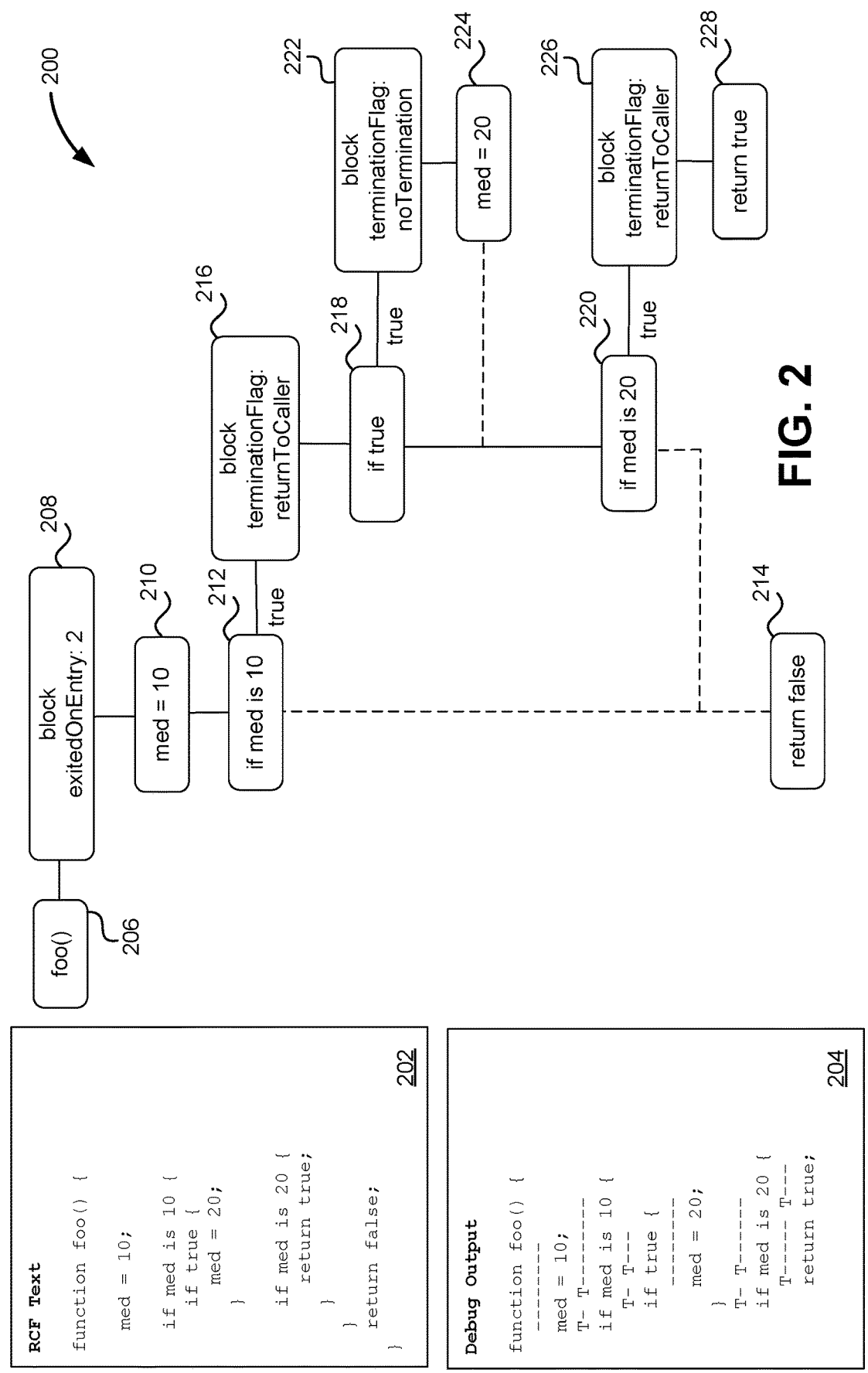
FIG. 2 illustrates an example process of annotating configuration language function evaluation according to one or more embodiments.

FIG. 2 illustrates an example process 200 of annotating configuration language function evaluation according to one or more embodiments. Block 202 shows a user-written block of RCF code. Block 204 shows a corresponding debug output with explanatory evaluation annotations. At block 206, function foo( ) is evaluated, which involves first evaluating block 208. Evaluating block 208, in turn, involves executing block 210, which assigns a value of 10 to the variable "med." This assignment corresponds to the series of hyphens above the statement 'med=10' in block 204, which take on the same width as the statement in block 210. As noted in Table 1, above, this series of hyphens without a letter prefix is an evaluation bar. In some embodiments, attribute values may be displayed before or after evaluation. In some other embodiments, attribute values may be displayed at function entry points. Debugging continues to block 212, which is a conditional statement that results in the display of two "True Bars" in the terminology of Table 1. These "True Bars" correspond to the single conditional evaluation (med is 10) which evaluates to true based on the assignment of block 210. Next, the contents of block 216 are executed based on the fact that the conditional statement of block 212 was true. Block 216 is itself another conditional statement, which always evaluates as true, and therefore the debug output has two "True Bars."

Because the conditional statement associated with block 218 evaluates to true, execution proceeds to block 222, which contains the assignment of block 224. Block 224 contains a second assignment (med=20) which in the debug output again has a set of hyphens which take on the same width as the statement in block 210. As noted in Table 1, above, this series of hyphens without a letter prefix is an evaluation bar. Next, execution continues to block 220, which contains a conditional statement (if med is 20) which, because of the assignment in block 224 evaluates to true. Execution therefore proceeds to block 226 where the function is exited with a "return true" statement. As indicated by the dashed line from block 212 to block 214, had the block of code in block 220 not returned true at block 228, execution would have proceeded to block 214, which would have returned false, and a corresponding debug output of a "False Bar" would have been displayed. Similarly, if the conditional test performed at block 212 does not return true, execution proceeds as shown in connection with the dashed line between block 220 and block 214.

Figure 3:
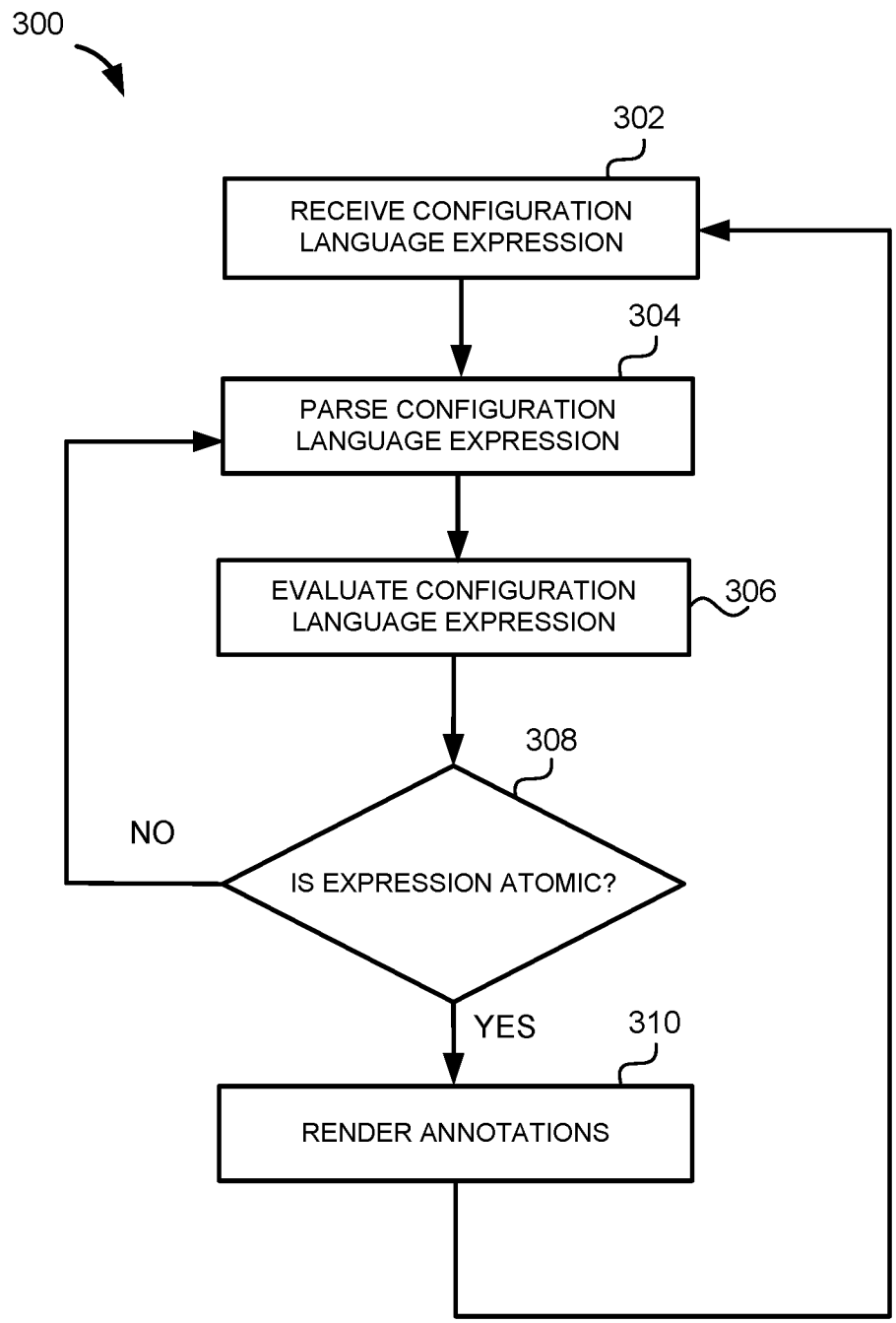
FIG. 3 illustrates an example method for annotating configuration language function evaluation according to one or more embodiments.

FIG. 3 illustrates an example method 300 for annotating configuration language function evaluation according to one or more embodiments. At step 302, one or more configuration language expressions are received by a configuration language development environment, sometimes referred to as an RCF evaluation engine. In some embodiments, the one or more configuration language expressions may be received in connection with a command line interface. At step 304, the one or more configuration language expressions are parsed into one or more composite or atomic configuration language expressions. Composite configuration language expressions are made up of two or more atomic configuration language expressions. At step 306, the one or more composite or atomic configuration language expressions are evaluated based on a particular route at the specified point of execution in an application. In some embodiments, evaluating the one or more atomic configuration language expressions comprises evaluating one or more operators that operate on the one or more atomic configuration language expressions. Example operators may include logical AND or logical OR. Rendering the annotations to provide an explanation of an underlying control flow may further comprise rendering a textual representation of whether operators were short circuited. Short circuiting of an operator may occur when process flow associated with an evaluation of RCF language bypasses a particular line or set of lines containing the short circuited operator. Evaluating the one or more atomic configuration language expressions may further comprise evaluating the one or more atomic configuration language expressions under an operator precedence corresponding to multiple operators.

At test 308, it is determined whether a currently evaluated expression is atomic, meaning the statement can be evaluated directly. If yes, execution proceeds to step 310, if not execution continues back to step 304 at which point the currently evaluated expression is further broken down. At step 310, the annotations are rendered to provide an explanation of an underlying control flow. In some embodiments, changes to RCF code result in re-parsing and rendering of updated annotations. Under such circumstances, execution flow may return from step 310 to step 302 to repeat the above-described processes. Rendering the annotations to provide an explanation of an underlying control flow may further comprise rendering an overall result of the called function.

Example Network Device

Figure 4:
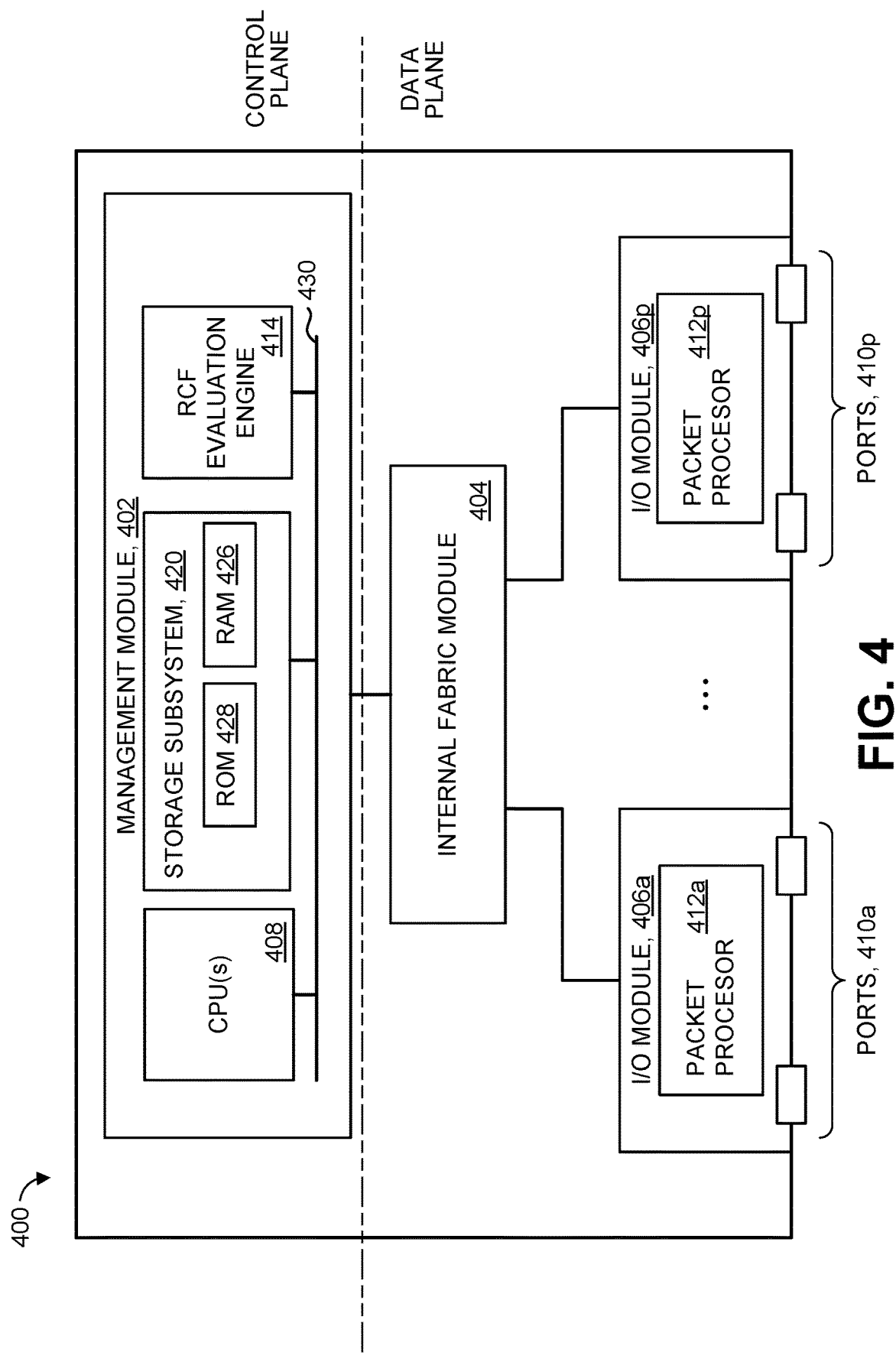
FIG. 4 illustrates an example of a network device that can be adapted in accordance with one or more embodiments.

FIG. 4 illustrates an example network device 400 that can be adapted in accordance with some embodiments of the present disclosure. Network device 400 may be a device or a router, for example. As shown, network device 400 may include management module 402, internal fabric module 404, and a number of I/O modules 406a-406p. Management module 402 may be disposed in a control plane (also referred to as control layer) of the network device 400 and can include one or more management CPUs 408 for managing and controlling operation of network device 400 in accordance with the present disclosure. Management CPU(s) 408 may be general-purpose processors, such as an Intel®/AMD® x86-64 or ARM® processor, that operates under the control of software stored in a memory, such as storage subsystem 420, which may include read-only memory (ROM) 428 and/or random-access memory (RAM) 426. Within the control plane is also provided RCF evaluation engine 414, which performs the functions of RCF evaluation consistent with the present teachings. In some embodiments, RCF evaluation engine 414 may perform evaluation of RCF language in connection with CPU(s) 408. In some other embodiments, RCF evaluation engine 414 may be contained in connection with storage subsystem 220, such that computer executable instructions implementing RCF evaluation engine 414 may be transmitted from the control plane to a frontend system, such as a web browser or other thin client technology. The control plane refers to all the functions and processes that determine which path to use, such as routing protocols, spanning tree, and the like.

Internal fabric module 404 and I/O modules 406a-406p collectively represent a data plane of network device 400 (also referred to as data layer, forwarding plane, etc.). Internal fabric module 404 is configured to interconnect the various other modules of network device 400. Each I/O module 406a-406p includes one or more input/output ports 410a-410p that are used by network device 400 to send and receive network packets. Each I/O module 406a-406p can also include a packet processor 412a-412p. Each packet processor 412a-412p may comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Example Host Device

FIG. 5 illustrates an exemplary hardware platform according to one or more embodiments. Computer 500 can be a desktop computer, a laptop computer, a server computer, a mobile device such as a smartphone or tablet, or any other form factor of general- or special-purpose computing device containing at least one processor. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, and network storage, such as cloud network storage. Network 516 is in turn connected to public Internet 526, which connects many networks globally. In some embodiments, computer 500 can itself be directly connected to public Internet 526.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Having thus described various embodiments of the invention, what is claimed as new and desired to be protected by Letters Patent includes the following:

1. A computer-implemented method in a network device for annotating configuration language function evaluation, the method comprising the network device:
   receiving, by a configuration language development environment, one or more configuration language expressions;
   parsing the one or more configuration language expressions into one or more atomic configuration language expressions;
   receiving routing path information from one or more neighbor devices including inbound routes, outbound routes, and route distribution;
   receiving a route to be evaluated from a neighbor device;
   evaluating the received route by evaluating the one or more atomic configuration language expressions based on the received route and the gathered routing path information; and
   generating and displaying annotations that illustrate a flow of execution of the atomic configuration language expressions corresponding to evaluation of the received route, the annotations indicating operations performed and outcomes of the operations.

2. The method of claim 1, wherein evaluating the one or more atomic configuration language expressions comprises evaluating one or more operators that operate on the one or more atomic configuration language expressions.

3. The method of claim 2, wherein generating and displaying annotations comprises rendering a textual representation of whether operators were short circuited.

4. The method of claim 1, wherein evaluating the one or more atomic configuration language expressions comprises evaluating the one or more atomic configuration language expressions under an operator precedence corresponding to multiple operators.

5. The method of claim 1, further comprising displaying attribute values assigned during evaluation of the the one or more atomic configuration language expressions.

6. The method of claim 1, wherein generating and displaying annotations comprises rendering an overall result of contents of a called function.

7. The method of claim 1, wherein the one or more configuration language expressions is received via a command line interface.

8. One or more non-transitory computer-readable media in a network device storing computer-executable instructions that, when executed by a processor, perform a method of annotating configuration language function evaluation, the method comprising:
   receiving, by a configuration language development environment, one or more configuration language expressions;
   parsing the one or more configuration language expressions into one or more atomic configuration language expressions;
   receiving routing path information from one or more neighbor devices including inbound routes, outbound routes, and route distribution;
   receiving a route to be evaluated from a neighbor device;
   evaluating the received route by evaluating the one or more configuration language expressions based on the received route and the gathered routing path information; and
   generating and displaying annotations that illustrate a flow of execution of the atomic configuration language expressions corresponding to evaluation of the received route, the annotations indicating operations performed and outcomes of the operations.

9. The one or more non-transitory computer-readable media of claim 8, wherein evaluating the one or more atomic configuration language expressions comprises evaluating one or more operators that operate on the one or more atomic configuration language expressions.

10. The one or more non-transitory computer-readable media of claim 9, wherein generating and displaying annotations comprises rendering a textual representation of whether operators were short circuited.

11. The one or more non-transitory computer-readable media of claim 10, wherein evaluating the one or more atomic configuration language expressions comprises evaluating the one or more atomic configuration language expressions under an operator precedence corresponding to multiple operators.

12. The one or more non-transitory computer-readable media of claim 11, wherein generating and displaying annotations comprises rendering an overall result of a called function.

13. The one or more non-transitory computer-readable media of claim 12, wherein generating and displaying annotations comprises rendering an overall result of contents of the called function.

14. The one or more non-transitory computer-readable media of claim 8, wherein the one or more configuration language expressions is received via a command line interface.

15. A system for annotating configuration language function evaluation, the system comprising:
   a processor; and
   one or more non-transitory computer-readable media storing computer-executable instructions that, when executed by the processor, perform a method comprising:
      receiving, by a configuration language development environment, one or more configuration language expressions;
      parsing the one or more configuration language expressions into one or more atomic configuration language expressions;
      receiving routing path information from one or more neighbor devices including inbound routes, outbound routes, and route distribution;
      receiving a route to be evaluated from a neighbor device;
      evaluating the received route by evaluating the one or more configuration language expressions based on the received route and the gathered routing path information; and
      generating and displaying annotations that illustrate a flow of execution of the atomic configuration language expressions corresponding to evaluation of the received route, the annotations indicating operations performed and outcomes of the operations.

16. The system of claim 15, wherein evaluating the one or more atomic configuration language expressions comprises evaluating one or more operators that operate on the one or more atomic configuration language expressions.

17. The system of claim 16, wherein generating and displaying annotations comprises rendering a textual representation of whether operators were short circuited.

18. The system of claim 15, wherein evaluating the one or more atomic configuration language expressions comprises evaluating the one or more atomic configuration language expressions under an operator precedence corresponding to multiple operators.

19. The system of claim 18, wherein generating and displaying annotations comprises rendering an overall result of a called function.

20. The system of claim 19, wherein generating and displaying annotations rendering an overall result of contents of the called function.

* * * * *